No. 707,202. Patented Aug. 19, 1902.
O. C. BURDICT & B. C. CANDEE.
MECHANICAL MOVEMENT FOR NUT MAKING OR OTHER MACHINERY.
(Application filed Nov. 1, 1900.)
(No Model.)
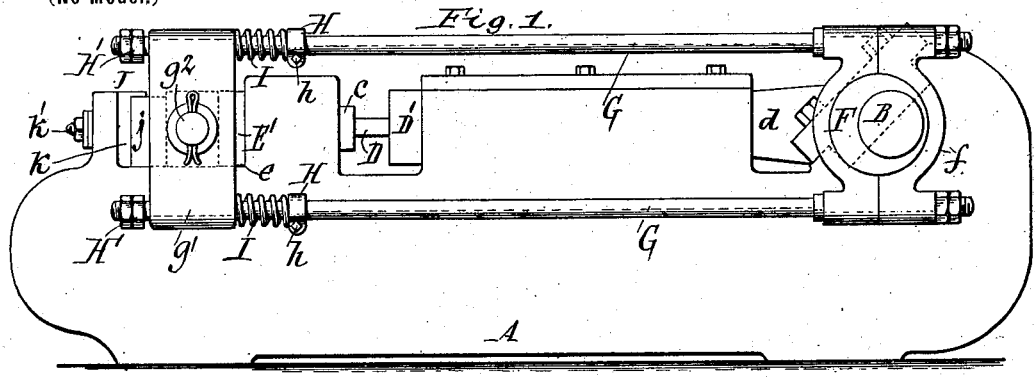
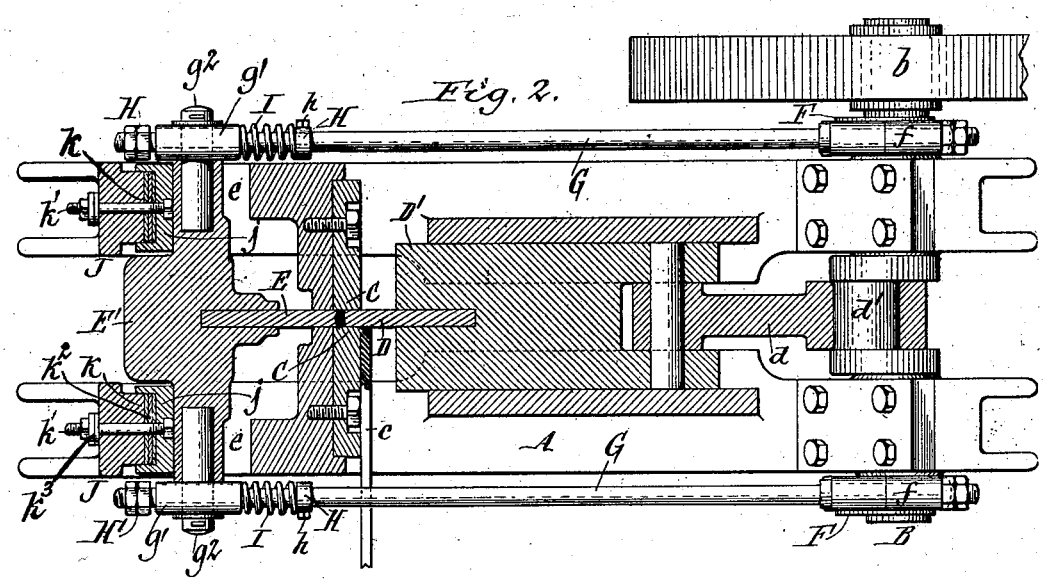
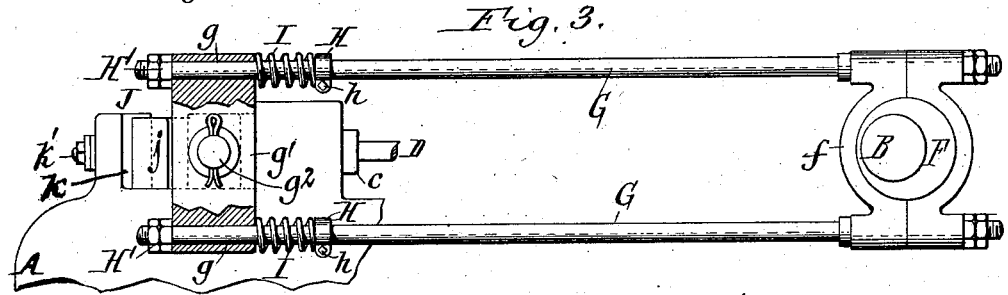
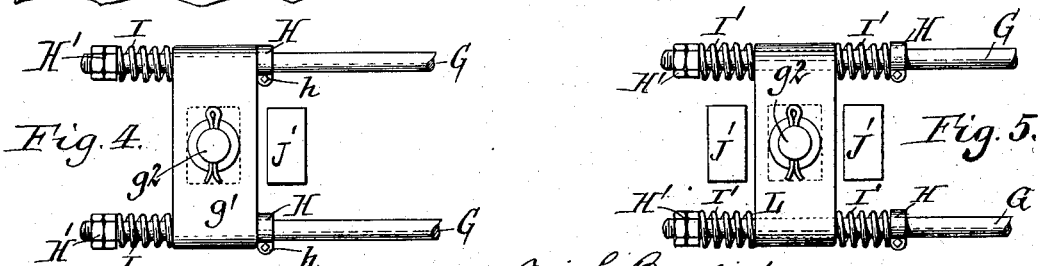
Witnesses.
Henry L. Deck.
F. F. Scherzinger.
Inventors
Orrin C. Burdict
Bertram C. Candee
By Wilhelm Bonner
Attorneys.

UNITED STATES PATENT OFFICE.

ORRIN C. BURDICT AND BERTRAM C. CANDEE, OF BUFFALO, NEW YORK; SAID CANDEE ASSIGNOR TO SAID BURDICT.

MECHANICAL MOVEMENT FOR NUT-MAKING OR OTHER MACHINERY.

SPECIFICATION forming part of Letters Patent No. 707,202, dated August 19, 1902.

Application filed November 1, 1900. Serial No. 35,110. (No model.)

*To all whom it may concern:*

Be it known that we, ORRIN C. BURDICT and BERTRAM C. CANDEE, citizens of the United States, residing at Buffalo, in the county of Erie and State of New York, have invented new and useful Improvements in Mechanical Movements for Nut-Making or other Machines, of which the following is a specification.

This invention relates to a mechanical movement for converting rotary motion into intermittent motion. This change of motion has heretofore usually been obtained by the use of a cam; but this is undesirable in machinery which is subjected to great strains, such as nut-making machines, because the cam usually bears only at one place against a roller or other part, which receives the thrust and soon wears out, thereby necessitating frequent renewal or adjustment of the parts.

The object of this invention is to actuate an intermittently-reciprocating part or member from a rotary eccentric, thereby obtaining the advantage of the large bearing-surface provided by an eccentric and causing the parts to wear longer and at the same time causing the actuated part to stand still for a considerable time.

In the accompanying drawings, Figure 1 is a side elevation of a nut-making machine embodying our invention. Fig. 2 is a top plan view of the same, partly in section. Fig. 3 is a fragmentary side elevation of the mechanism containing our invention and showing the same in a different position from Fig. 1. Fig. 4 is a reversal of the mechanism in Figs. 1, 2, and 3. Fig. 5 shows a modification of our invention.

Like letters of reference refer to like parts in the several figures.

The nut-making machine shown in Figs. 1 to 3 of the drawings and containing our improved mechanical movement consists, essentially, of a main frame A, a shaft B, journaled transversely on the main frame and provided with a pulley or balance-wheel $b$, a forming-die C, a longitudinal reciprocating cutter or punch D, which is arranged in front of the die and cuts the nut-blank from a bar $c$ and pushes the same into the forming-die, a slide D', carrying the cutter and connected by a pitman $d$ with a crank $d'$ on the shaft, a reciprocating crowning-punch E, which is arranged in the rear part of the die and has a concave front end, whereby the convex crown is formed on the nut and which also ejects the nut from the die, and a horizontally-reciprocating slide E', which carries the crowning-punch and which is guided in ways $e\ e$ on the main frame.

In the operation of the machine the end of the bar from which the nuts are made is moved in front of the opening in the die. The cutter then moves forwardly and cuts off the nut-blank from the end of the bar and pushes the same into the die. During the forward movement of the cutter the crowning-punch is arranged in the rear end of the die and is at rest, so that the nut is pressed against the same by the cutter and a convex crown is formed on the top of the nut. The cutter is now retracted rearwardly and then the crowning-punch moves forwardly and ejects the nut from the die and then moves backward to its position of rest preparatory to receiving the next nut-blank.

The mechanism whereby the crowning-punch is moved intermittently forward and backward for ejecting the nut and is then permitted to remain at rest during the crowning operation is constructed as follows:

F F represent two eccentrics arranged on opposite ends of the main shaft and provided with the usual surrounding eccentric-straps $f\ f$.

G G represent two pairs of connecting-rods which are arranged lengthwise on opposite sides of the frame and which connect the eccentrics with the crowning-punch slide. The rods of each pair are secured at their front ends to the upper and lower part of the strap of one of the eccentrics, while the rear ends of the rods pass loosely through horizontal openings $g\ g$, formed one above the other in a swivel-head $g'$. The latter is pivoted on a wrist $g^2$ on the corresponding end of the slide which carries the crowning-punch. Each of the connecting-rods is provided in front and in rear of the swivel-head with shifting shoulders H H'. Each of the front shoulders H consists, preferably, of a split collar, which is adjustably secured to the rod by a screw $h$, which connects the split parts of the collar. The rear shoulders H' consist of screw-nuts which engage with screw-threads on the rods.

I represents springs which surround the connecting-rods between the front side of the swivel-head and the front collar H, Figs. 1 to 3.

J J represent stops or abutments whereby the backward movement of the crowning-punch slide is arrested and which are arranged in rear of the ends of the slide. Each of these stops preferably consists of an abutment-plate $j$, which is guided on a thrust-lug $k$, arranged on the main frame, a screw-bolt $k'$ connecting the abutment-plate with said lug, washers $k^2$, arranged between the abutment-plate and the thrust-lug, and washers $k^3$, arranged between the head of the screw-bolt $k'$ and the thrust-lug. In order to permit the crowning-punch to stand still while the cutter-punch is pressing the nut against the same, the abutments are adjusted so as to arrest the backward movement of the crowning-punch before the eccentrics complete their rearward stroke. During the first part of the rearward stroke of the eccentrics the swivel-heads of the crowning-punch slide are held by the springs I against the rear shoulders H', which causes this slide at this time to move in unison with the eccentrics. Before the eccentrics reach the end of their rearward stroke the crowning-punch slide engages the abutments and is arrested against further backward movement with the eccentrics. While the latter complete their backward movement independent of the crowning-punch slide the connecting-rods G move rearwardly through the swivel-heads, whereby the springs I are compressed until the eccentrics reach the rear end of their backward stroke. During the first part of the subsequent forward stroke of the eccentrics the connecting-rods move idly forward through the swivel-heads, while the latter remain at rest until the rear shoulders H' of the rods engage the rear side of the swivel-heads, and thereafter the crowning-punch slide is compelled to move forward with the eccentrics to the end of the forward stroke thereof. By this means a forward-and-backward reciprocating motion is imparted to the crowning-punch for ejecting the formed nut, and then the punch is permitted to rest during the crowning operation, although the eccentrics which actuate the crowning-punch are rotating continuously. It will thus be seen that by connecting an actuating-eccentric with the part to be actuated in this manner the advantage of a large bearing-surface provided by the eccentric is fully utilized, thereby reducing the wear upon the machine to a minimum.

By adjusting the abutment-plates on the main frame and shifting the shoulders H H' on the rods the movement of the working position of the crowning-punch may be varied as desired. The shoulders H H' can be shifted on the connecting-rod after loosening the same, and the abutment-plates may be adjusted by loosening the screw-bolts $k'$ and varying the number of washers $k^2$ $k^3$ between the thrust-lugs, the abutment-plates, and the screw-bolts $k'$ until the parts are in the required position.

Although we have shown our mechanical movement applied to a nut-making machine, the same is applicable to various purposes in which a rest is required in a reciprocating or oscillating part and in which the motion is derived from a rotating eccentric. For some purposes the rest of the part which is actuated must take place during the forward stroke of the eccentric, in which case the location of the spring I is reversed and arranged between the rear side of the swivel-head and the rear shoulder, and an abutment $j'$ is arranged in front of the slide or actuated part, as shown in Fig. 4. When it is necessary to produce a rest in the actuated part L in the middle of the stroke of the eccentric, two abutments J' J' are arranged on opposite sides of the actuated part L and springs I' I' are arranged between opposite sides of the actuated part and the shoulders H H' on the connecting-rods, as shown in Fig. 5.

We claim as our invention—

1. The combination of a slide, actuating mechanism for said slide including a lost-motion connection, a stop for arresting said slide before said actuating mechanism therefor reaches the end of its stroke, a second slide, parts carried by said slides and arranged one in advance of the other in a plane parallel to the direction of movement of said slides, and means for reciprocating said second slide, whereby the part carried thereby approaches the part carried by said first slide while the latter is at rest, substantially as set forth.

2. The combination of two slides arranged one in advance of the other in substantially the same plane, actuating mechanism for one of said slides including a lost-motion connection, a stop for arresting said slide before said actuating mechanism therefor reaches the end of its stroke, and means for reciprocating said second slide whereby the same approaches the first-mentioned slide while the latter is at rest, substantially as set forth.

3. The combination of two slides mounted to reciprocate in substantially the same plane and arranged one in advance of the other, actuating mechanism for the front slide including a lost-motion connection, a stop for arresting said first slide before said actuating mechanism therefor reaches the end of its stroke, and means for reciprocating said rear slide whereby the same approaches the front slide while the latter is at rest, substantially as set forth.

4. The combination of a slide, a rotary shaft, operating connections between said slide and said rotary shaft including a lost-motion device, a second slide, operative connections between said second slide and said shaft, parts carried by said slides and arranged one in advance of the other in a plane parallel to the direction of movement of the slides, and a stop for arresting said first-mentioned slide before said second-mentioned slide reaches the end of its stroke, substantially as set forth.

5. The combination with a slide, of rotary eccentrics, pitmen connected to said eccentrics and loosely connected to said slide, shoulders on said pitmen, springs interposed between said shoulders and said slide at one side, shoulders on said pitmen at the other side of said slide, and a stop adapted to arrest the movement of said slide before said eccentrics reach the end of their stroke, substantially as set forth.

Witness our hands this 6th day of October, 1900.

ORRIN C. BURDICT.
BERTRAM C. CANDEE.

Witnesses:
 THEO. L. POPP,
 E. A. VOLK.